United States Patent [19]

Wang

[11] Patent Number: 5,526,894

[45] Date of Patent: Jun. 18, 1996

[54] POWER- AND/OR MANUALLY-DRIVEN COLLAPSIBLE GOLF CART

[76] Inventor: Eric J. F. Wang, 35 Quail Run, Massapequa, N.Y. 11758

[21] Appl. No.: 421,223

[22] Filed: Apr. 13, 1995

[51] Int. Cl.[6] .................................................. B60K 1/00
[52] U.S. Cl. ........................ 180/65.1; 280/646; 280/652; 280/DIG. 5
[58] Field of Search ................................. 180/65.1, 19.1, 180/19.2, 19.3, 13; 280/645, 646, 42, 651, 652, DIG. 5, DIG. 6

[56] References Cited

U.S. PATENT DOCUMENTS

| | | | |
|---|---|---|---|
| 4,106,553 | 8/1978 | Nemeth | 280/DIG. 5 |
| 4,289,324 | 9/1981 | Nemeth | 280/DIG. 5 |
| 4,356,875 | 11/1982 | Clune | 180/3 |
| 4,418,776 | 12/1983 | Weirick | 280/DIG. 5 |
| 5,137,103 | 8/1992 | Cartmell | 280/DIG. 5 |
| 5,143,399 | 9/1992 | Liu | 280/DIG. 6 |
| 5,167,389 | 12/1992 | Reimers | 280/DIG. 5 |
| 5,180,023 | 1/1993 | Reimers | 280/DIG. 5 |

*Primary Examiner*—Richard M. Camby
*Attorney, Agent, or Firm*—Galgano & Burke

[57] ABSTRACT

A power- and/or manually- driven golf cart which is collapsible, without disassembly, into a compacted configuration for storing or transporting, and extendable, without assembly, into an operable or usable configuration for carrying a golf bag about a golf course. The golf cart includes a golf bag support frame, a pair of lateral support members pivotally connected to the frame and to a pair of ground support wheels, a power-driven wheel supported at the lower end of golf bag support frame, and a power drive mounted on the front side of the frame. A hinge is operably connected between a lower end of the upper frame member and an upper end of the lower frame member to permit the upper frame member and the lower frame member to be pivotally moved between a substantially aligned extended position and a substantially adjacent folded position. At least two connecting rods are pivotally connected at one end to the upper frame member and at their other ends to one of the lateral support members. When the upper frame member and the lower frame member are pivotally moved to a substantially aligned extended position, the ground support wheels are disposed outward from the golf bag support frame, and when the upper frame member and the lower frame member are pivotally moved to a substantially adjacent folded position, the ground support wheels are disposed closely adjacent to the golf support frame.

11 Claims, 4 Drawing Sheets

POWER- AND/OR MANUALLY-DRIVEN COLLAPSIBLE GOLF CART

BACKGROUND OF THE INVENTION

The present invention relates generally to a golf cart for carrying a golf bag with clubs and other golf equipment about a golf course. More particularly, the invention relates to a power- and/or manually-driven golf cart which is collapsible, without disassembly, into a compacted configuration for storing or transporting, and extendable, without assembly, into an operable or usable configuration for carrying a golf bag about a golf course.

Interest in the game or golf has been growing with more and more people now playing the sport. Various golf carts have been devised for carrying a golf bag with clubs about a golf course to help make the game of golf more enjoyable and less strenuous to a golfer.

One example of such golf carts is a manually propelled golf cart, or push or pull cart. Generally, a manually propelled golf cart includes a substantially elongate golf bag support frame member which forms at its upper end a handle and which at its lower end attaches to a horizontal frame member that attaches to a pair of ground support wheels. Manually propelled golf carts have been devised having either a fixed or non-collapsible configuration, or a collapsible configuration to facilitate storing or transporting from one location to another.

Examples of manually propelled collapsible golf carts include U.S. Pat. No. 4,913,460 granted to Klein, U.S. Pat. No. Re. 33,939 granted to Cheng; and U.S. Pat. No. 4,784,401 granted to Raguet. Klein discloses a two-wheeled manually propelled collapsible golf cart. The golf cart includes a substantially elongate golf bag support frame having ground supporting wheels. A gas spring is pivoted between relatively pivotable parts of the frame for biasing the golf cart toward either a collapsed and non-collapsed position.

Cheng discloses a manually propelled collapsible and telescopic golf cart that includes a substantially elongate golf bag support frame having ground supporting wheels. The frame includes three sections; a lower section, a middle section and an upper section. The lower section and middle section are pivotally and laterally interconnected by a hinge and adapted to be swung between an aligned extended position and an adjacent compacted position. The top section is adapted to telescope within a hollow inner space of the middle section.

Raguet discloses a manually propelled collapsible golf cart having a substantially elongate golf bag support frame having ground supporting wheels. A central hinge is provided between pivotal parts of the frame and between pivotal parts of side legs which attach at one end to the frame and attach at to the other end to ground support wheels. An interconnecting post is pivotally connected via linking members to each pivotable part of the frame and each side leg.

Examples of power driven golf carts include U.S. Pat. No. 4,657,100 granted to Lewis and U.S. Pat. No. 4,848,504 granted to Olsen. Lewis discloses a portable power driven golf cart that includes two ground support wheels which support a solid rigid axle upon which is mounted a main horizontal frame. A substantially elongate golf bag support frame is connected to the horizontal frame by a pivot connection so that the bag support frame can rotate from one position where it is essentially perpendicular to the horizontal frame to a second position where it is in alignment with such horizontal frame. The bag support frame is made of at least two section, an upper support frame section and a lower support frame section, which are pivotal with respect to each other. A motor is supported by the main horizontal frame and connected by gears to the axle for driving the two ground support wheels. The cart includes a unpowered support wheel at the lower end of the lower support frame section.

Olsen discloses a convertible walking/riding golf cart that includes three detachable units; a drive unit, a steering and golf bag support unit, and a riding unit. The drive unit has a frame supported on wheels connected to a battery operated motor. The steering and golf bag support unit is connected detachably to the drive unit and has releasable golf bag connectors and a handle bar mounting a speed control and brake control. The riding unit has a wheeled-supported platform connected detachably to the drive unit for adjustment between a operative position extending horizontally rearward form the drive unit for supporting a person on the platform for riding, and a storage position disposed vertically closely adjacent the drive unit to allow a person to walk behind the drive unit while grasping the handle bar. The three units are quickly and easily detached from each other for storage and transport in the trunk of an automobile.

In addition, there are a number of commercially available power-driven golf carts currently for sale on the market. As in Lewis and Olsen above, these commercially available power-driven golf carts include a motor operably attached to a solid axle spanning between and attaching to each of two ground support wheels. Such power-driven golf carts having a solid axle is limited in its ability to be collapsible or necessarily requiring disassembly of major components in order to be compacted.

Examples of commercially available manually operated power-driven golf carts having a solid axle spanning between and attaching to each wheel include, the Talisman electric trolley manufactured in Scotland; PowaKaddy Classic and PowaKaddy Rio manufactured by PowaKaddy International, Ltd. of England: the Power Golf Trolley manufactured by Hill Billy of England, the Minn Kota electric golf caddy manufactured by Paradigm Sports, Inc of Montgomery, Minn.; the Caddymatic manufactured in England, and the Le Retriver II manufactured in France.

Theima Technology, Inc. of Santa Clara, Calif. manufactures the SEI Caddie, a robotic caddie for carrying a golf bag with clubs which automatically goes wherever the golfer goes. The robotic caddie includes an rearward pair of ground support wheels mounted on a solid axle and a single forward wheel powered by a motor.

The problem with powered golf carts is that they are either not collapsible to allow for easy storage or transport or they are heavy, bulky and cumbersome to collapse, store and/or transport. So far as is known, no presently available optionally power- or mechanically-driven golf cart is as easily and facilely collapsible into a conveniently small and relatively lightweight and easily transportable and storagable collapsed golf cart as herein provided.

SUMMARY OF THE INVENTION

Accordingly, it is an object of the present invention to provide a power-driven collapsible golf cart that is propelled by a motor or that can be pushed manually about a golf course.

It is another object of the present invention to provide a power-driven collapsible golf cart that is easily and quickly collapsible, without disassembly, into a compacted configuration for storing or transporting in a trunk of an automobile.

It is also another object of the present invention to provide a power-driven collapsible golf cart that is easily and quickly extendable, without assembly, into an extended configuration for ready use in carrying a golf bag with clubs about a golf course.

It is still another object of the present invention to provide a power-driven collapsible golf cart that in one simple motion of the handle can be easily reconfigured from an extended configuration to a compacted configuration and visa-versa.

It is still yet another object of the present invention to provide a power-driven collapsible golf cart in which a golf bag can remain attached to the golf cart while re-configuring the golf cart from an extended configuration to a compacted configuration and visa-versa.

It is a further object of the present invention to provide a power-driven collapsible golf cart that is simple in construction and which may be manufactured relatively simply and inexpensively.

Certain of the foregoing and related objects are readily obtained in a power- and/or manually-driven collapsible golf cart which includes a golf bag support frame having an upper frame member and a lower frame member and having a front side and a rear side, golf bag support means mounted on the golf bag support frame for mounting a golf bag on the front side of the golf bag support means, hinge means operably connected between a lower end of the upper frame member and an upper end of the lower frame member for permitting the upper frame member and the lower frame member to be pivotally moved between a substantially longitudinally aligned extended position and a substantially adjacent generally parallel folded position, and releasable lock means for releasably locking the upper and lower frame members in the extended position. The cart additionally includes a pair of freely-rotatable ground-support wheels, at least two lateral support members pivotally connected at one end to the lower frame member and at an opposite end to opposite ones of the ground-support wheels, at least two connecting rods each pivotally connected at one end to the upper frame member and at an opposite other end to opposite ones of the lateral support members, and a power-driven wheel supported at the lower end of said lower frame member. The golf cart further includes power drive means for driving the power-driven wheel including a power source, preferably a DC battery, mounted on the front side of golf bag support frame member so that when the upper frame member and the lower frame member are pivotally moved to a substantially longitudinally aligned extended position, the ground support wheels are disposed outward from the golf bag support frame, and when the upper frame member and the lower frame member are pivotally moved to a substantially adjacent, generally parallel folded position, the ground support wheels are disposed closely adjacent to the rear side of the golf support frame.

Preferably, the power driven wheel includes a motor disposed in a hub of the power-driven wheel, the hinge means includes a U-shaped bracket attached to the upper end of the lower frame member with the U-shaped bracket having ends for pivotally connecting to the lower end of the upper bracket via a through pin, and the golf cart further includes a second bracket attached to the lower frame member, the second bracket having at least two tabs each for pivotally connecting to one of the lateral support members.

Desirably, the collapsible golf cart further includes an upper and lower bag cradle each having cradle straps, a slidable cap for securing golf bag support frame in an extended position and a handle attached to the upper end of the upper frame member. Most desirably, the handle includes an on-off switch, a forward-reverse switch, and variable speed control knob, each of the switches and the knob operably connected to operate the power-driven wheel.

BRIEF DESCRIPTION OF THE DRAWINGS

Other objects and features of the present invention will become apparent from the following detailed description considered in connection with the accompanying drawings, which discloses one embodiment of the invention. It is to be understood that the drawings are to be used for the purpose of illustration only and not as a definition of the limits of the invention.

In the drawings, wherein similar reference characters denote similar elements throughout the several views.

DESCRIPTION OF THE PREFERRED AND ILLUSTRATED EMBODIMENT

Turning now in detail to the drawings, therein illustrated is a novel, optionally manually- or power-driven collapsible golf cart 10 embodying the present invention which is quickly and easily placed in its expanded configuration (FIG. 1) ready for carrying a golf bag (not shown) about a golf course, and in its compacted or folded configuration (FIG. 4) ready for storing or transporting.

Figure 1:
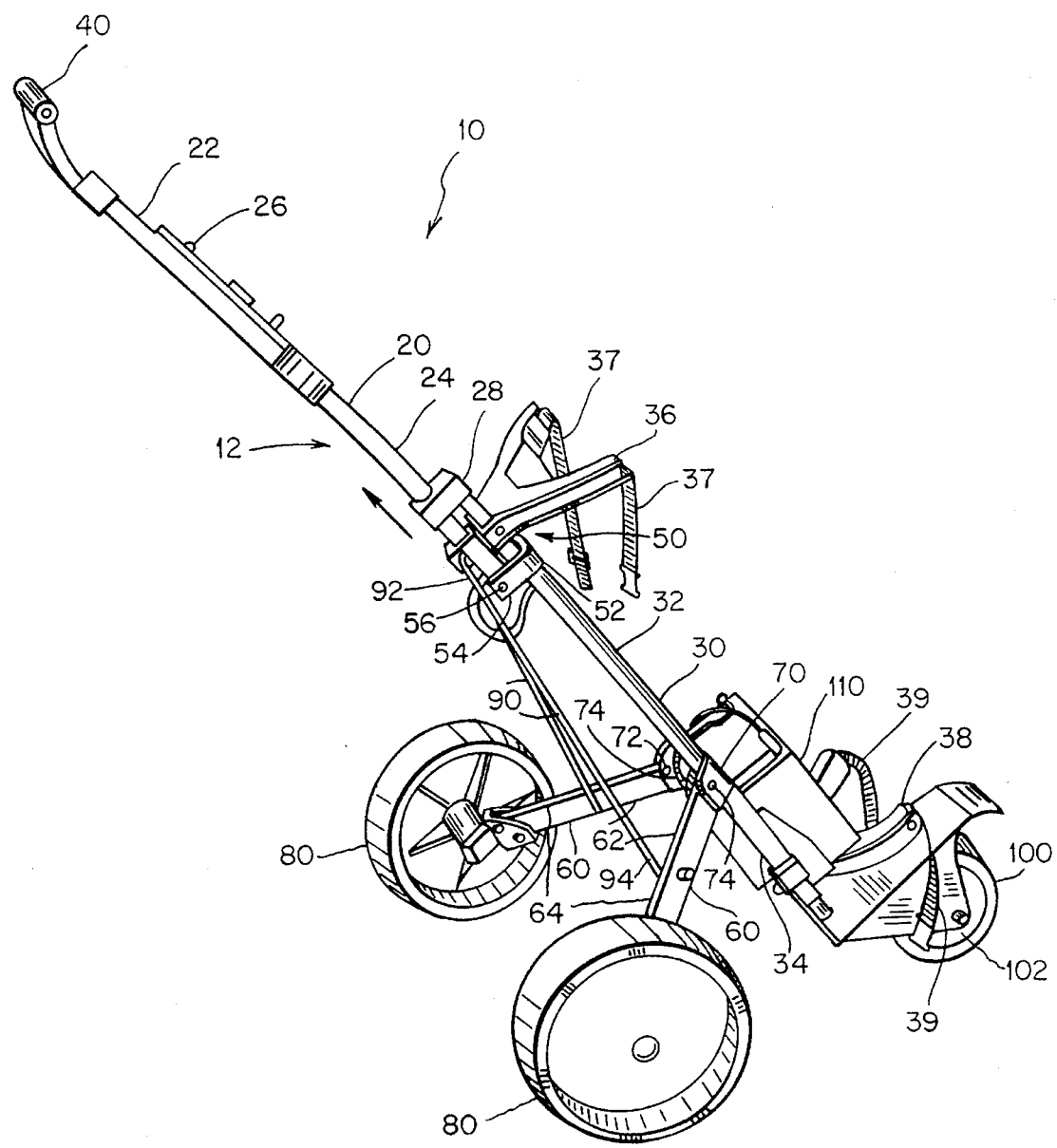
FIG. 1 is a side and rear perspective view of a collapsible motorized golf cart embodying the present invention in its fully extended or usable configuration with a golf bag removed for clarity.
Figure 2:
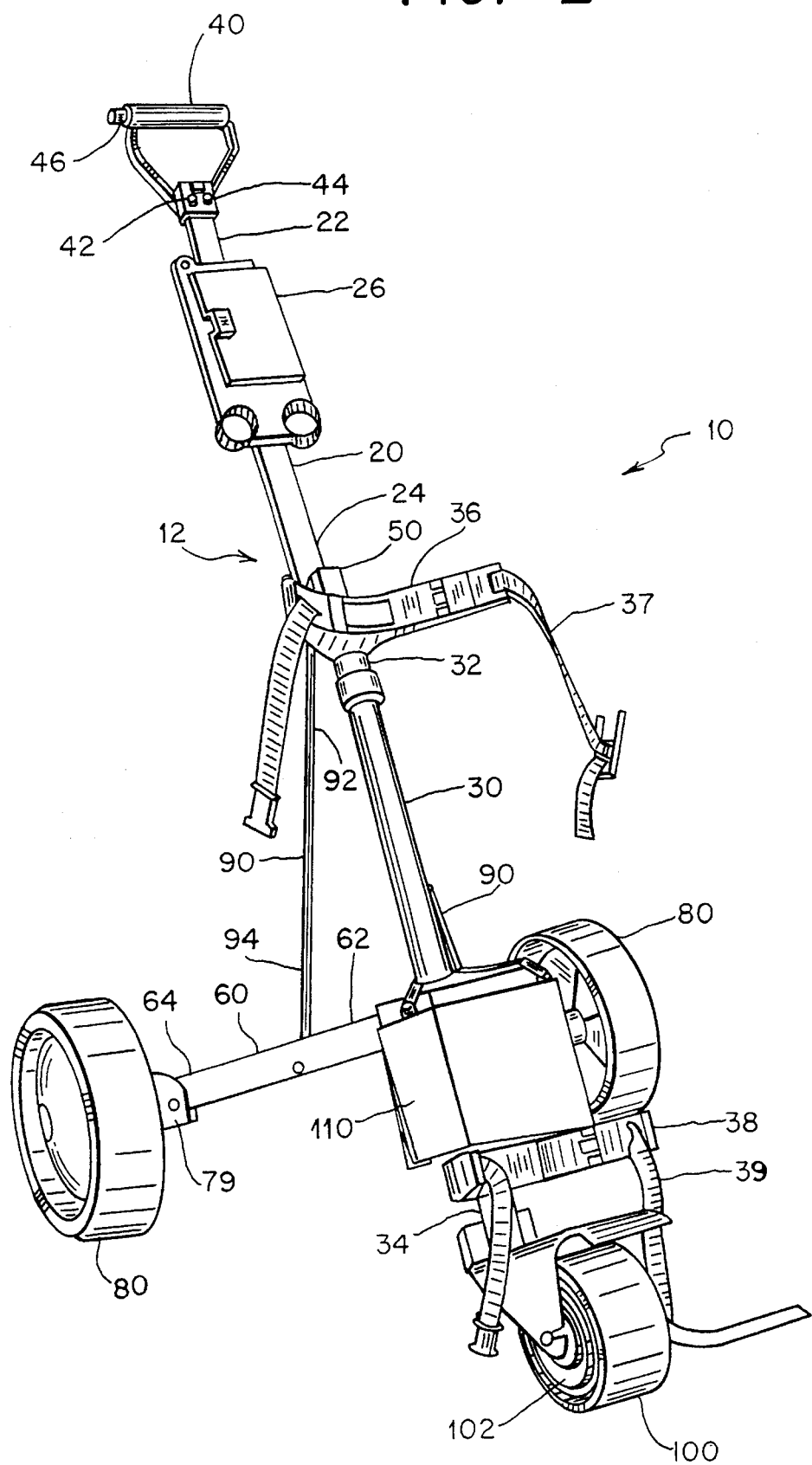
FIG. 2 is a front and side perspective view of the golf cart shown in FIG. 1, illustrating its fully extended or operable configuration.

Referring to FIGS. 1 and 2, power-driven collapsible golf cart 10 generally includes a golf bag support frame, generally designated 12, which includes an elongate upper frame member 20 and a elongate lower frame member 30. A handle 40 is attached to upper end 22 of upper frame member 20. Mounted along upper end 22 of upper frame member 20 below handle 40 is a clip board 26 for holding a golf score card and two golf balls (not shown). Mounted on upper end 32 of lower frame member 30 is an upper bag cradle 36 having cradle straps 37 and mounted on lower end 34 of lower frame member 30 is a lower bag cradle 38 having cradle straps 39.

Figure 3:
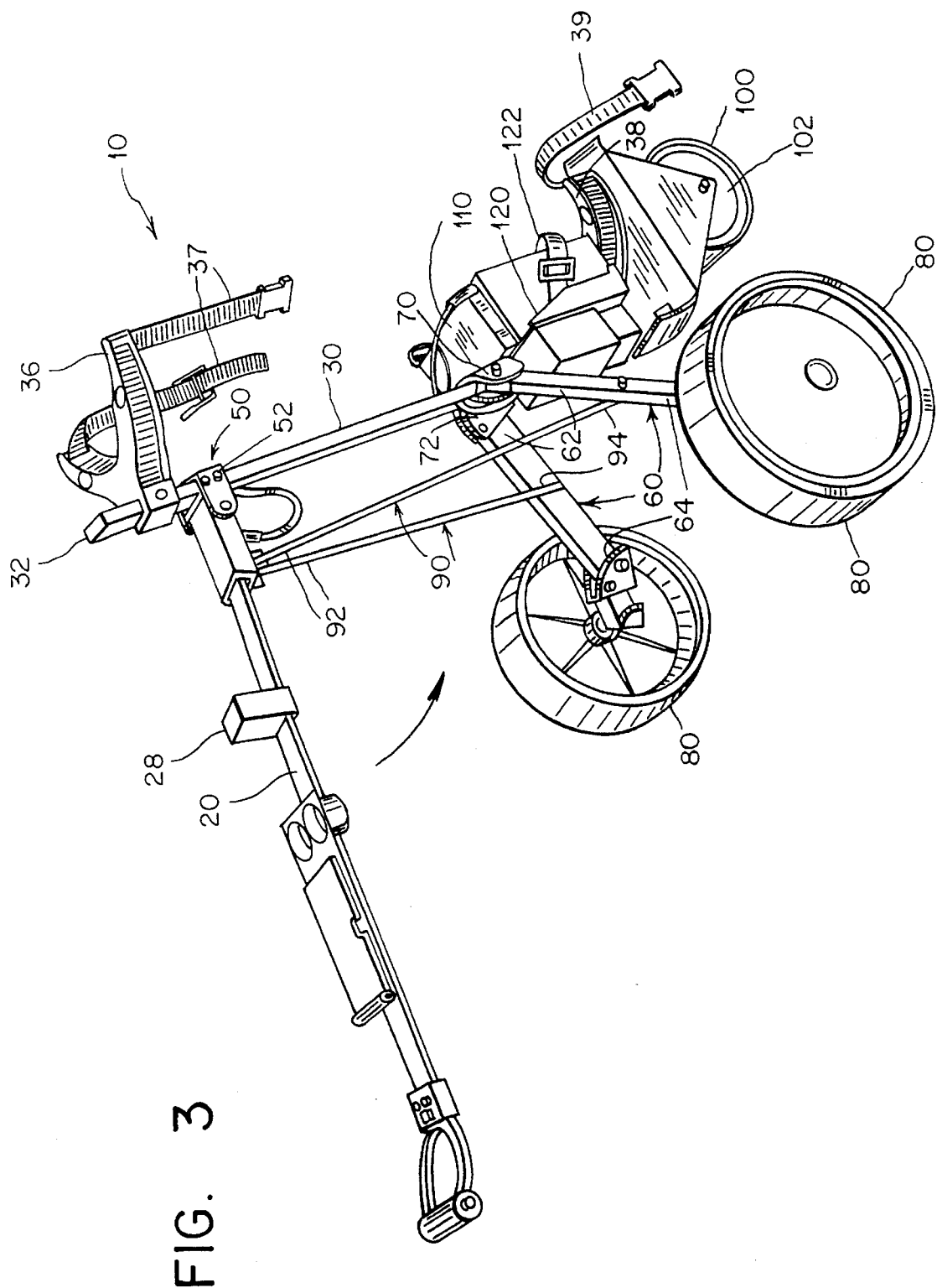
FIG. 3 is an enlarged side and rear perspective view, illustrating the golf cart shown in FIG. 1 in a partially folded configuration.
Figure 4:
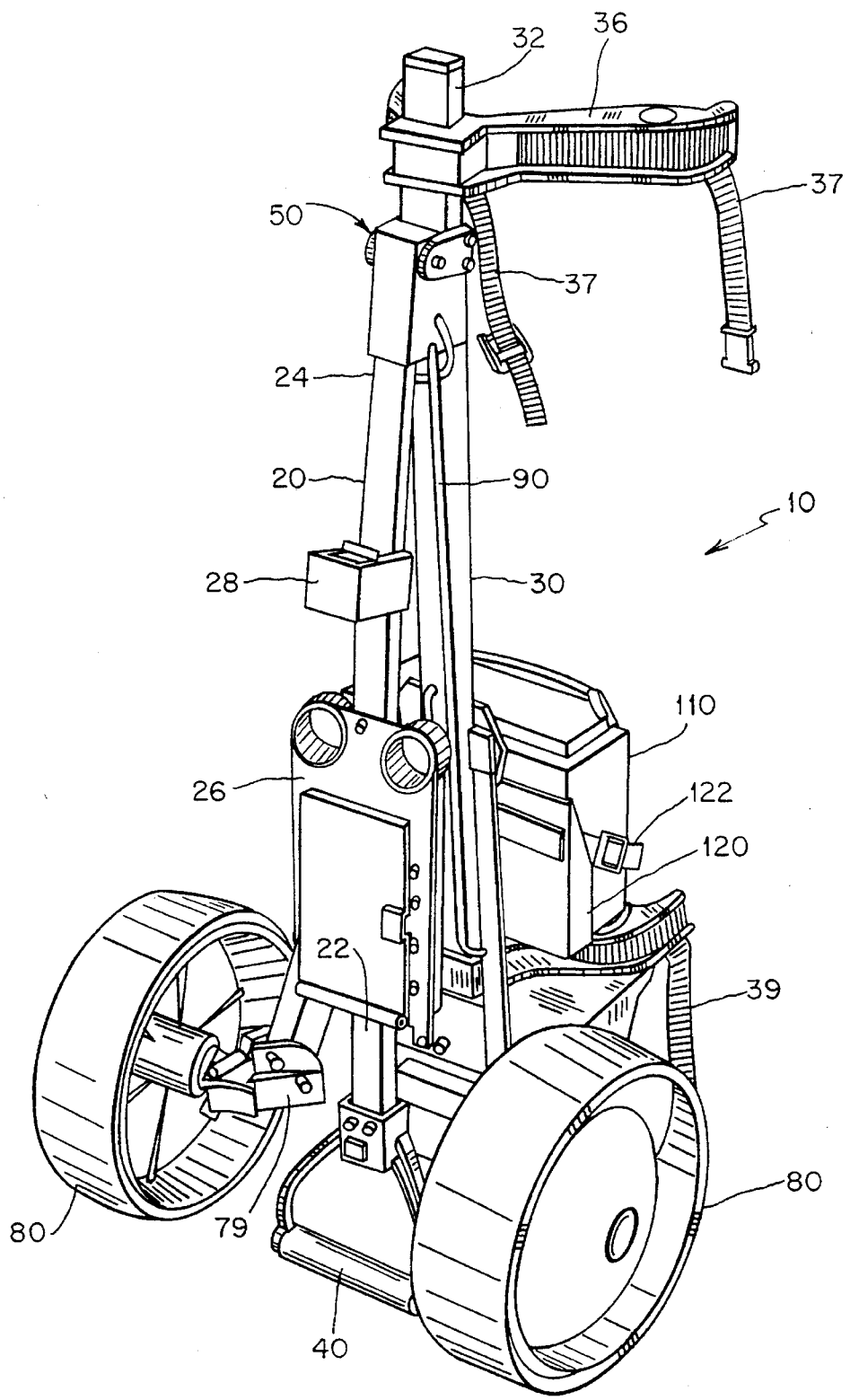
FIG. 4 is an enlarged perspective view, illustrating the golf cart shown in FIG. 1 in a fully folded configuration for storing or transporting.

Hinge means 50 is operably connected between lower end 24 of upper frame member 20 and upper end 32 of lower frame member 30 for permitting upper frame member 20 and lower frame member 30 to be pivoted relative to one another in either a substantially extended generally longitudinally aligned position (defining an angle of 180° between them), as shown in FIG. 1, or a substantially parallel and adjacent compacted or folded position (defining an angle of close to 0° therebetween), as shown in FIG. 4. More specifically, hinge means 50 includes a U-shaped bracket 52 suitably attached by screws, rivets or welds, to lower frame member 30 below upper cradle 36. Each leg 54 (only one shown in FIG. 1) of U-shaped bracket 50 is pivotally connected to lower end 24 of upper frame member 20 by a through pin 56. A slidable cap 28 is received on upper frame member 20 and is movable between a locking position (FIGS. 1 and 2) and a non-locking position (FIGS. 3 and 4) with respect to the fully-extended and collapsed positions of frame members 20, 30, as described in greater detail hereinafter.

Referring again to FIGS. 1 and 2, a pair of lateral support members or support legs 60 are pivotally connected at one end to the lower frame member 30 of golf bag support frame 12 and pivotably connected at their opposite ends to the respective axle assemblies 79 of a pair of ground support wheels 80. A power-driven wheel 100 is supported at the lower end of golf bag support frame 12. Specifically, lower frame support member 30 has a generally V-shaped bracket 70 (shown only in FIG. 1) attached thereto between upper end 32 and lower end 34 and the free-end leaves or tabs 72 of bracket 70 are each respectively pivotally connected to one of the lateral support members 60 by a pin 74. It should be appreciated that each lateral member 60 could comprise a pair of spaced-apart beams or rods, if desired.

A pair of connecting rods or members 90 pivotally interconnect upper frame member 20 and each lateral support member 60. Specifically, each connecting member 90 includes a first end 92 and a second end 94. Each first end 92 of connecting members 90 is pivotally connected to upper frame member 20 adjacent to its lower end 24. Each second end 94 of connecting members 90 is pivotally connected to one lateral member 60 at the mid section thereof.

Power-driven wheel 100 is supported at lower end 34 of lower frame member 30. Supported above power-driven wheel is a battery 110 for supplying electrical power for propelling power-driven collapsible golf cart 10. Battery 110 is secured in casing 120 (shown in FIGS. 3 and 4) for supporting battery 110 and a battery strap 122 (shown in FIGS. 3 and 4) for releasably securing battery 110 in place during use and for permitting removal of battery 110 for recharging.

Power-driven wheel 100 further includes a motor (not shown) disposed in a hub 102 of power-driven wheel 100, which drives wheel 100. It is appreciated that power-driven wheel can be powered by a motor disposed outside the wheel and supported on golf bag support frame 12. Transferring power to the wheel can include gears or a chain or other suitable power transferring means (not shown).

Referring to FIG. 2, power-driven collapsible golf cart 10 is controlled by a golfer by controls located on handle 40. Specifically, handle 40 includes an on-off switch 42, a forward-reverse switch 44, and a variable speed control knob 46. Each switch and knob is operably connected via wires (not shown) to battery 110 and motor 102. As can be appreciated, turning switch 42 "on" connects the motor to the battery 110 to effect operation of the motor 102 to drive wheel 100. Adjustment of variable speed control knob 46 to a higher or lower setting will raise or lower the current or power delivered by the battery 110 to the motor 102 and, in turn, the motor rpm and ultimately the wheel rpm and speed of the golf cart. Forward-reverse switch 44 controls the reversible motor to change its rotational direction and, in turn, the direction of rotation of drive wheel 100. The actual circuit arrangement which allows these functions is well known by those skilled in the art.

The movement and operation of re-configuring power-driven collapsible golf cart 10 from an extended configuration (FIGS. 1 and 2) to a compacted configuration (FIGS. 3 and 4) is best illustrated in FIG. 3. Referring first to FIG. 1, golf bag support frame member 12 of power-driven collapsible golf cart 10 is shown in a substantially aligned extended position with slidable cap 28 positioned over the top end 32 of lower support member 30 to lock upper frame member 20 to lower frame member 30 wherein ground support wheels 80 are disposed outward from the golf bag support frame 12. To reconfigure power-driven collapsible golf cart 10 in a compacted configuration, slidable cap 28 is slid upward away from upper end 32 of lower frame member 30. Upper frame member 20 is then swung downward in the direction of the curved arrow shown in FIG. 3, pivotably downwardly about its lower end 24 via hinge means 50. As upper frame member 20 is pivoted toward lower frame member 30, connecting members or control rods 90 attached to upper frame member 20 force lateral members 60 to pivot and move downward and toward each other.

FIG. 4 illustrates power-driven collapsible golf cart 10 in its compacted configuration with upper frame member 20 generally parallel and adjacent lower frame member 30, and ground support wheels 80 positioned closely adjacent upper frame member 20 and lower frame member 30. To redeploy the golf cart in its operating or extended position, the procedure is simply reversed, with one moving the upper frame member 30 in a reverse direction to the arrow shown in FIG. 3, which, in turn, causes control rods 90 to pull the beams 60 and wheels 80 upwardly and outwardly to assume the FIG. 1 position, at which point cap 28 is slid down over the end 32 of lower frame member 30 to lock the frame members together in this extended stance. It should be noted that power-driven collapsible golf cart 10 neither requires assembly in order for it to be placed in an extended configuration for use nor disassembly in order for it to be placed in a compacted configuration since the power source, i.e., battery 110 and the driving means are generally located on the front side of the golf cart, as a result of which they do not interfere with the collapsing of the wheels generally disposed on the rear side of the cart.

Various modifications may be made, as will be apparent to those skilled in the art. For example, it will be appreciated that one skilled in the art could employ other suitable locking means for releasably locking upper frame member and lower frame member in an extended position. In addition, a variety of drive means could be used for driving wheel 100, or for that matter, wheels 80. However, it is preferred that only wheel 100 be driven so that the golfer may operate wheels 80 manually in a non-powered manner, if desired, with the power driven wheel raised above the ground so as not to interfere with its freely-rotatable wheels 80.

Thus, while only one embodiment of the present invention have been shown and described, it is obvious that many changes and modifications may be made relative thereto without departing from the spirit and scope of the invention.

What is claimed is:

1. A power- and/or manually-driven collapsible golf cart, comprising:

a golf bag support frame having an upper frame member and a lower frame member and having a front side and a rear side;

a handle attached to an upper end of said upper frame member;

golf bag support means mounted on said golf bag support frame for mounting a golf bag on said front side of said golf bag support means, said golf bag support means comprising an upper and lower bag cradle;

hinge means, operably connected between a lower end of said upper frame member and an upper end of said lower frame member, for permitting said upper frame member and said lower frame member to be pivotally moved between a substantially longitudinally aligned extended position and a substantially adjacent generally parallel folded position;

releasable lock means for releasably locking said upper and lower frame members in said extended position;

a pair of freely-rotatable ground-support wheels;

at least two lateral support members pivotally connected at one end to said lower frame member and at an opposite end to opposite ones of said ground-support wheels;

at least two connecting rods each pivotally connected at one end to said upper frame member and at an opposite other end to opposite ones of said lateral support members;

a power-driven wheel supported at said lower end of said lower frame member adjacent to said front side thereof;

power drive means for driving said power-driven wheel including an electrical battery power source mounted on said front side of golf bag support frame member, generally above said power-driven wheel; and an on-off switch, a forward-reverse switch, and a variable speed control knob disposed closely adjacent said handle, each of said switches and knob being operably connected to said power drive means to operate said power-driven wheel;

so that when said upper frame member and said lower frame member are pivotally moved to a substantially longitudinally aligned extended position, said ground-support wheels are moved laterally and rearwardly outward from said golf bag support frame, and when said upper frame member and said lower frame member are pivotally moved to a substantially adjacent, generally parallel folded position, said upper end of said upper frame member and said handle are moved closely adjacent to said lower end of said lower frame member, and said ground-support wheels are moved laterally and forwardly inward toward said golf support frame so as to be disposed closely adjacent to the rear side of said golf support frame, with said upper end of said upper frame member and said handle being disposed between said ground-support wheels and closely adjacent to said power-driven wheel disposed on said front side of said lower frame member, and wherein said power drive means including said battery maintains its same mounted position on said golf cart in both said extended and folded positions thereof.

2. The golf cart according to claim 1, wherein said power driven wheel has a hub and said power drive means includes a motor disposed in said hub of said power-driven wheel.

3. The golf cart according to claim 1, wherein said hinge means includes a U-shaped bracket attached to an upper end of said lower frame member, said U-shaped bracket having means for pivotally connecting a lower end of said upper bracket frame member to an upper end of said lower frame member.

4. The golf cart according to claim 1, further including a second bracket attached to said lower frame member, said second bracket having at least two tabs each for pivotally connecting to one of said lateral members.

5. The golf cart according to claim 1, wherein said lock means includes a cap slidably mounted on said upper frame member and moveable over an upper end of said lower frame assembly for securing golf bag support frame in said extended position.

6. A power- and/or manually-driven collapsible golf cart, comprising:

a golf bag support frame having an upper frame member and a lower frame member and having a front side and a rear side;

golf bag support means mounted on said golf bag support frame for mounting a golf bag on said front side of said golf bag support means;

hinge means, operably connected between a lower end of said upper frame member and an upper end of said lower frame member, for permitting said upper frame member and said lower frame member to be pivotally moved between a substantially longitudinally aligned extended position and a substantially adjacent generally parallel folded position;

releasable lock means for releasably locking said upper and lower frame members in said extended position, said lock means including a cap slidably mounted on said upper frame member and movable over an upper end of said lower frame member for securing golf bag support frame in said extended position;

a pair of freely-rotatable ground-support wheels;

at least two lateral support members pivotally connected at one end to said lower frame member and at an opposite end to opposite ones of said ground-support wheels;

at least two connecting rods each pivotally connected at one end to said upper frame member and at an opposite other end to opposite ones of said lateral support members;

a power-driven wheel supported at said lower end of said lower frame member; and power drive means for driving said power-driven wheel including a power source mounted on said front side of golf bag support frame member so that when said upper frame member and said lower frame member are pivotally moved to a substantially longitudinally aligned extended position, said ground-support wheels are disposed outward from said golf bag support frame, and when said upper frame member and said lower frame member are pivotally moved to a substantially adjacent, generally parallel folded position, said ground-support wheels are disposed closely adjacent to the rear side of said golf support frame.

7. The golf cart according to claim 6, wherein said golf bag support means comprises an upper and lower bag cradle.

8. The golf cart according to claim 7, wherein said upper and lower bag cradle each include cradle straps.

9. The golf cart according to claim 6, further including a handle attached said upper end of said upper frame member.

10. The golf cart according to claim 9, wherein said handle includes an on-off switch, a forward-reverse switch, and a variable speed control knob, each of said switches and knob being operably connected to said power drive means to operate said power-driven wheel.

11. The golf cart according to claim 10, wherein said power source is an electrical battery.

* * * * *